Figure 7:
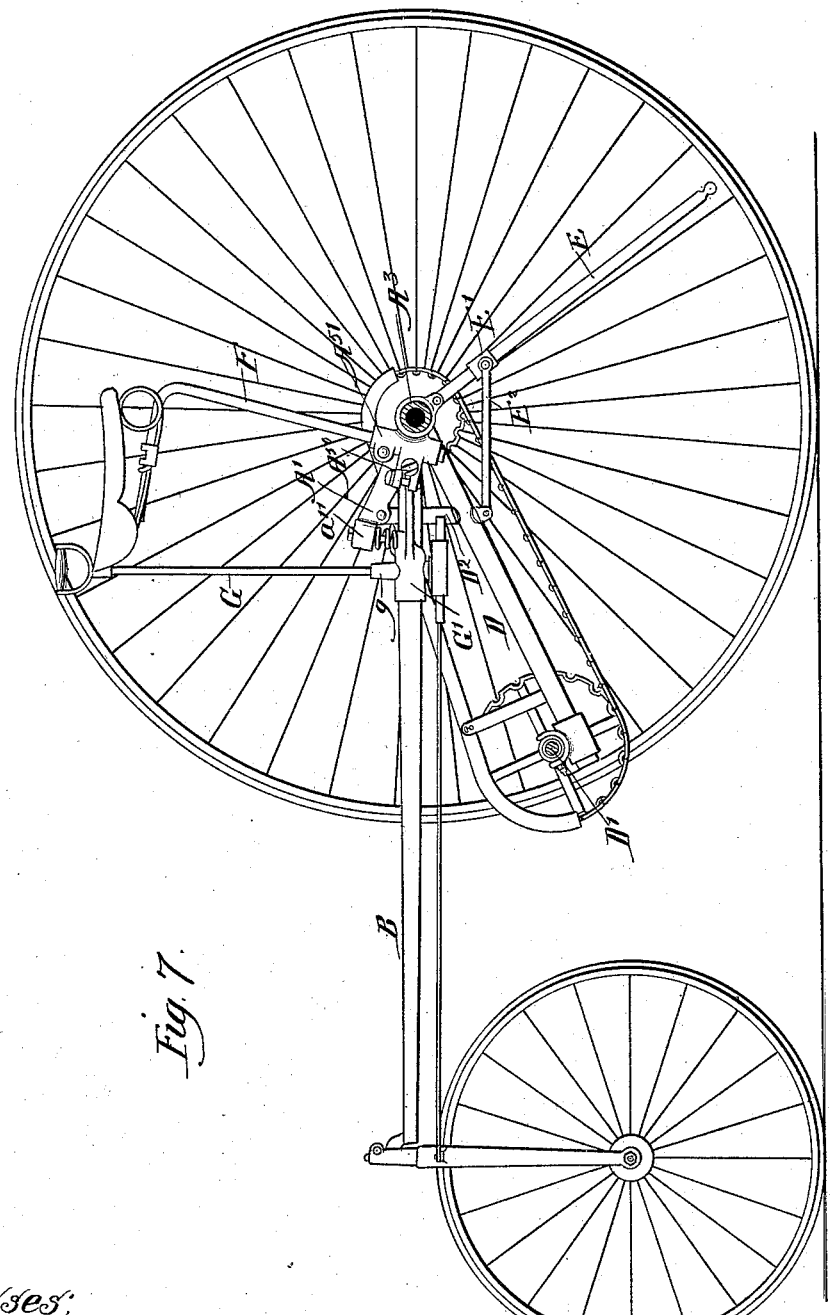

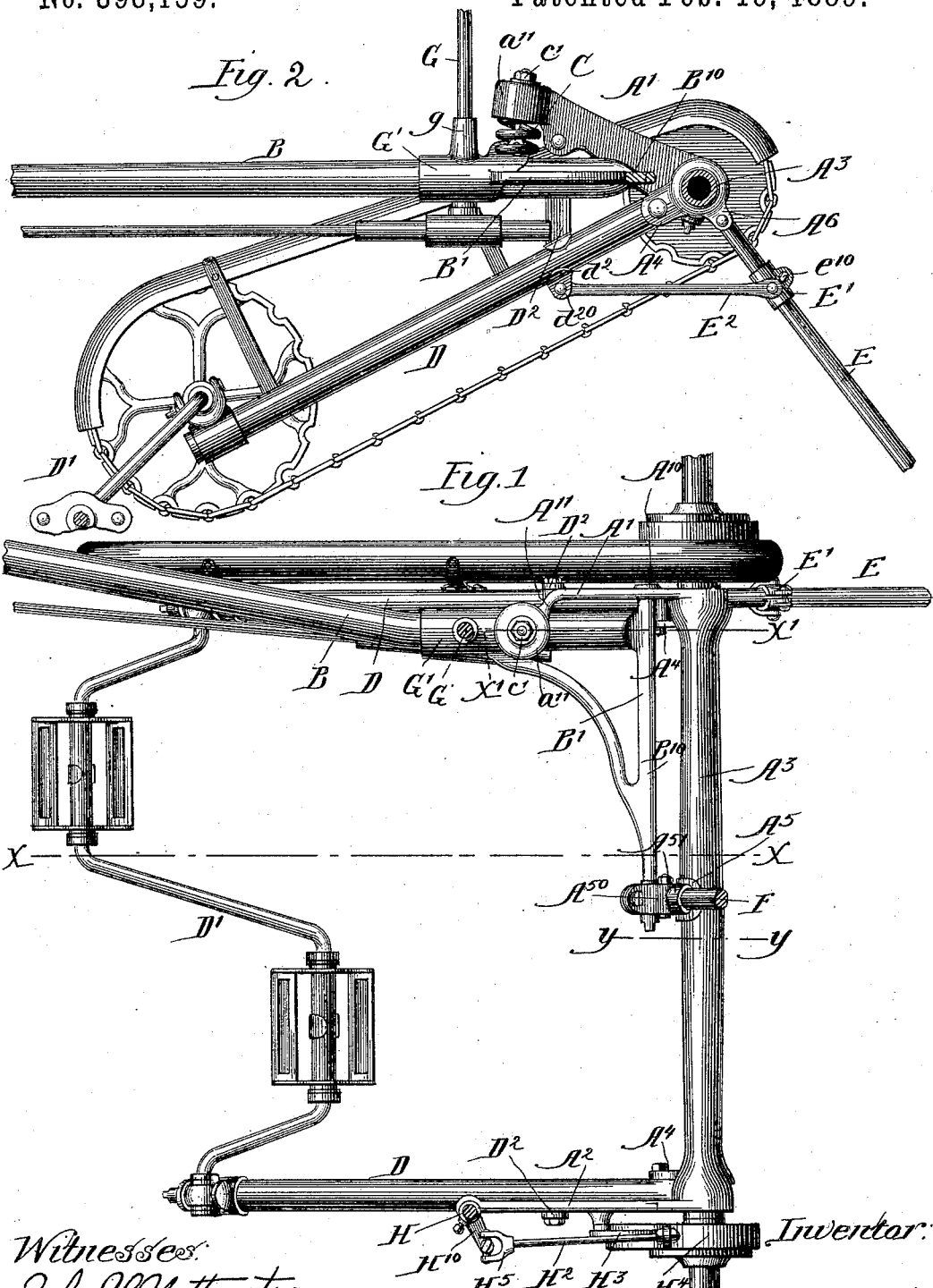

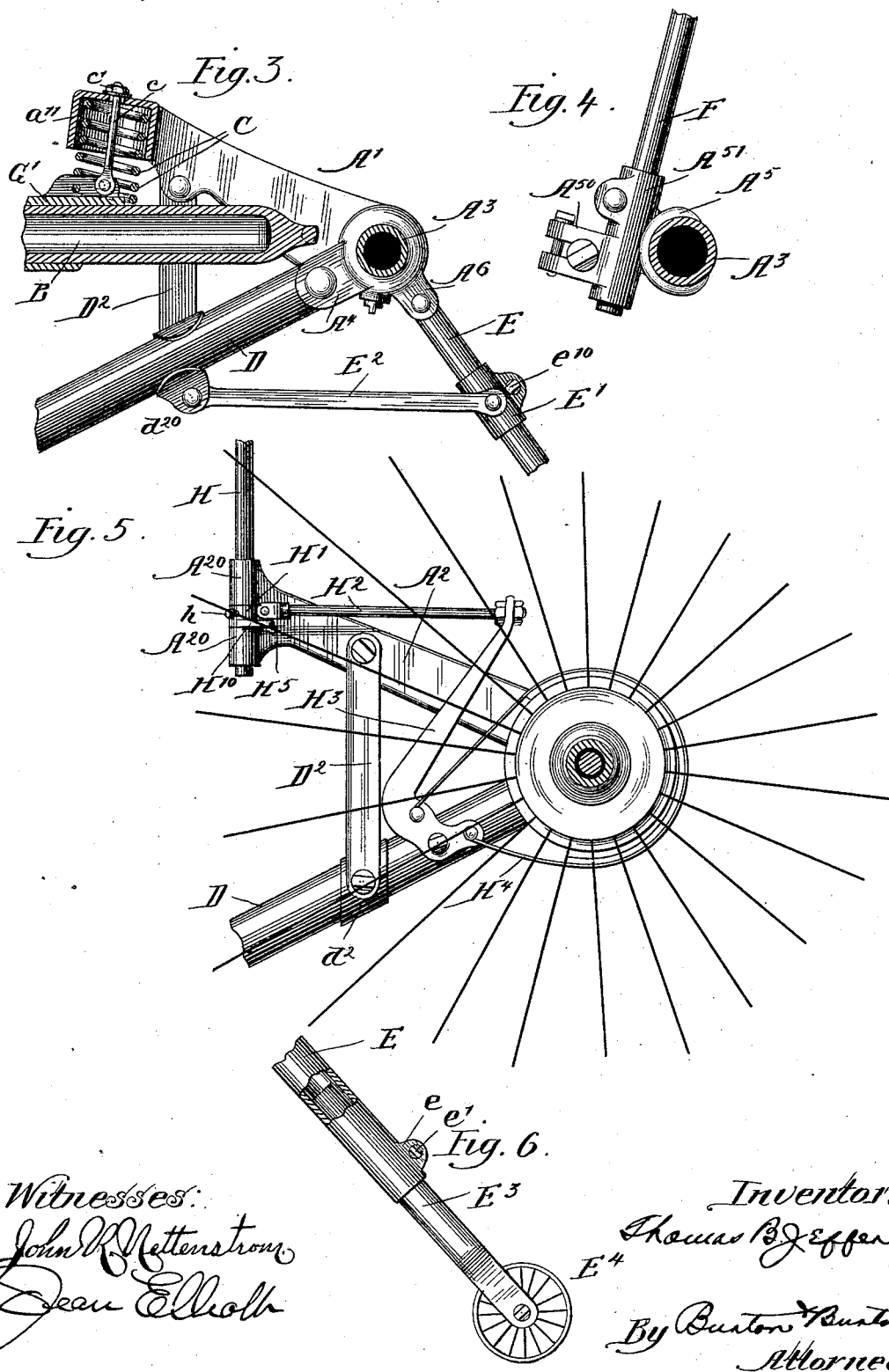

(No Model.) 3 Sheets—Sheet 3.

T. B. JEFFERY
VELOCIPEDE.

No. 398,159. Patented Feb. 19, 1889.

Witnesses:
John R. Nettenstrom
Jean Elliott

Inventor:
Thomas B. Jeffery
By Burton & Burton
Attorneys

UNITED STATES PATENT OFFICE.

THOMAS B. JEFFERY, OF RAVENSWOOD, ILLINOIS.

VELOCIPEDE.

SPECIFICATION forming part of Letters Patent No. 398,159, dated February 19, 1889.

Application filed May 12, 1888. Serial No. 273,652. (No model.)

*To all whom it may concern:*

Be it known that I, THOMAS B. JEFFERY, a citizen of the United States, residing at Ravenswood, in the county of Cook and State of Illinois, have invented certain new and useful Improvements in Velocipedes, which are fully set forth in the following specification, reference being had to the accompanying drawings, forming a part thereof.

In the drawings, Figure 1 is a plan of a portion of the principal parts of the frame-work of my improved velocipede, the reach to the forward steering-head and the seat-supports being broken off, as well as the main axle outside bearings, so that neither the forward wheel nor the seat nor the drive-wheel is shown. Fig. 2 is a section through the line $x$ $x$ on Fig. 1. Fig. 3 is a detail section through the line $x'$ $x'$ on Fig. 1. Fig. 4 is a detail sectional elevation of the clip which holds the seat-support and forms one pivot-bearing for the forward frame, the section being made at $y$ $y$ on Fig. 1. Fig. 5 is a detail side elevation of the brake and its operating mechanism. Fig. 6 is a detail elevation of the trailing wheel. Fig. 7 is a side elevation of the whole machine.

The rear or principal frame comprises the side bars, $A'$ $A^2$, which are connected in the vicinity of the main axle by the cross-bar $A^3$. From the said cross-bar are extended the lugs $A^4$ $A^4$, in proximity, respectively, to the side bars, $A'$ and $A^2$, but projecting from the cross-bar lower down than said side bars. To the cross-bar $A^3$, about the middle of its length, I secure a clip, $A^5$, which has the lug $A^{50}$ projecting forward and slightly upward, so that it affords a bearing in line with the bearing $A^{10}$ on the side bar $A'$, and in these two bearings I pivot the reach B, said reach having its length extending forward and being bent slightly to the right outward, so that it carries the steering-head at the forward end in line with the right-hand drive-wheel. At its rear end is formed a horizontal bracket, $B'$, whose arm $B^{10}$, extending transversely, constitutes the pivot of said reach, which is journaled in the bearings $A^{10}$ $A^{50}$. The side bar $A'$ has the extension $A^{11}$, terminating in the downwardly-open socket or pocket $a^{11}$, which overhangs the reach B a short distance forward from its pivot. A coiled spring, C, inserted in the socket $a^{11}$ and thereby retained in place, rests at its lower end upon the upper surface of the reach B and tends to force the reach downward with respect to the side bar $A'$. A link or bolt, $c$, placed within said spring, being connected at the lower end to the reach and passing through the top of the socket $A^{11}$, is provided with a stop-nut, $c'$, outside of said socket, whereby said link checks the action of the spring and prevents the reach being forced away from the side bar beyond a certain definite distance, determined by the position of the stop-nut on the link $c$.

To the lugs $A^4$ $A^4$ are pivoted, respectively, the bars D D, which constitute the pedal-crank-shaft frame, said bars extending downwardly and forwardly from their said connection to the lugs $A^4$, and having at their forward ends the bearings for the pedal-crank shaft $D'$. These bearings are held in fixed relation to the side bars, $A'$ and $A^2$, by the vertical braces $D^2$ $D^2$, which are secured at one end to the said bars B and at the other end to the side bars, $A'$ and $A^2$, respectively. The cross-bar $A^3$ has another lug, $A^6$, which, as illustrated, is located near the right-hand end of the cross-bar. It extends downward and rearward from the cross-bar, and to it I pivot a trailing-wheel arm, comprising the parts E and $E^3$. Upon the arm E there is clamped the clip $E'$, to which there is bolted the link $E^2$, the other end of which is bolted to a lug, $d^{20}$, formed on the clip $d^2$, which affords a means of fastening one of the braces $D^2$. The arm E is preferably made tubular, the lower end being split and furnished with lugs $e$, through which a screw or bolt, $e'$, passes to clamp them together, and into the lower end of this tubular arm there is inserted the spindle $E^3$, which at its lower end has the bearings for the trailing wheel $E^4$. The arm $E^3$ is held firmly in the arm E by tightening the clamp-screw $e'$, which thus draws together the lugs $e$ and contracts the opening in the tubular arm E, and the position of the trailing wheel $E^4$ may be adjusted by telescoping the two parts E and $E^3$ together and clamping the split end of the outer one, E, upon the inner one, $E^3$, thus making the entire trailing-wheel arm, which comprises both parts E and $E^3$, an extensible arm. The clip $E'$ is adjustable to any desired position on the trailing-wheel arm E, and may be secured at any position by the clamp-screw $e^{10}$. By sliding the clip up toward the cross-bar $A^3$ the trailing-wheel arm is caused to extend farther toward the rear as it is thus made to approach the horizontal position, and by sliding said clip down toward the trailing wheel the latter is drawn forward as the arm is drawn toward a vertical position. The purpose of this adjustment is to enable the rider to adapt the position of the trailing wheel to the character of the ground being traversed, for if a perfectly-level floor or track is being traversed the trailing wheel may be set quite close to the track; but if very rough ground is being traveled over the trailing wheel should stand far enough from the ground so that it will not collide with such obstructions as may exist in the irregularity of the surface. If the wheel were thus elevated, by merely telescoping the arm to shorten it the wheel might necessarily by this movement alone be lifted so high, in order to pass obstructions, that in case of a rear tilt, tending to throw the rider over backward, the trailing-wheel arm would reach nearly the vertical position before the trailing wheel would strike the ground and arrest the tilting movement, so that the rider would be in danger of being thrown over backward. Therefore, when it is necessary thus to raise the trailing wheel from the ground for the purpose indicated, the clip $E'$ will be moved up toward the cross-bar A, so that the trailing-wheel arm will be thrown upward and rearward toward a horizontal position, and for greater safety it will be extended also by drawing on the part $E^3$, still, however, keeping the trailing wheel far enough from the ground. Thus, instead of a shorter radius being obtained for the trailing wheel when it is raised from the ground on account of the roughness of the surface, a longer radius is obtained, so that, although the wheel may be quite a distance from the surface, a very slight change of angle or tilt rearward will bring it to the ground and arrest such backward tilting.

The seat-support F is adjusted vertically in the clip $A^5$, sliding through the sleeve $A^{51}$ thereon; and the construction here shown adapts said clip $A^5$ to serve both purposes already pointed out—viz., as a pivot-bearing for the front wheel or reach to the steering-head and as an open socket in which the seat-support is held and adjusted vertically.

The steering-handle rod G has its bearing in the boss $g$, formed upon the clip $G'$, which is secured upon the reach $A'$, and may conveniently be made the means, also, of connecting the lower end of the link $c$ to the reach, as shown in Fig. 3. The side bar $A^2$ is somewhat longer than the side bar $A'$, being extended forward far enough so that it has the bearings $A^{20}$ $A^{20}$ for the brake-handle rod H, which is in line transversely with the steering-handle rod G. For the purpose of simplifying the connection and fastening of said brake-handle rod in its bearings, I secure the collar $H'$ to the rod H between the two bearings $A^{20}$, making it of such size as to fill the space between them, so that when fastened to the rod H, as by the set-screw $h$, it stops the rod from longitudinal movement in both directions and prevents the necessity of any other stop collar or pin. At the same time the rod may be adjusted in it to bring the handle to any desired height by merely loosening the set-screw H and sliding the rod up or down to the collar $H'$ and tightening the set-screw when the handle is in the desired position. The collar H has the crank-arm $H^{10}$, to which is connected the brake-rod $H^2$, which operates the brake-lever $H^3$ to tighten or slacken the brake-band $H^4$.

The brake-rod $H^2$ is connected to the crank-arm $H^{10}$ by the universal joint shown at $H^5$, which permits the said rod to have both the motions necessary on account of its connection—one a slight oscillation in a horizontal plane as the handle H is rotated and the crank $H^{10}$ is caused to oscillate in a horizontal plane, and the other an oscillation in a vertical plane, caused by the guidance of its rear end by the brake-lever $H^2$, oscillating about its pivot on the bar D.

I claim—

1. In a velocipede, in combination with two rear supporting-wheels which have a common axis, the rear frame in which such wheels are journaled, the pedal-crank-shaft bearings secured to the rear frame and located forward of the vertical plane of the rear wheel-axle, and a forward frame or reach to the steering-head pivoted to the rear frame on a horizontal frame located rearward of the vertical plane of the pedal-crank-shaft bearings, whereby cross-bars forward of the pedal-crank-shaft bearings may be avoided, substantially as set forth.

2. In a velocipede, in combination with two rear supporting-wheels which have a common axis, the rear frame in which such wheels are journaled, the pedal-crank-shaft bearings secured to the rear frame and located forward of the vertical plane of the rear wheel-axle, and a forward frame or reach to the steering-head provided at its rear end with a bracket-like extension in a horizontal plane, which constitutes a horizontal pivot for said reach, whereby it is connected to the rear frame, said bracket-like extension being located wholly rearward from the vertical plane of the pedal-crank-shaft bearings, substantially as set forth.

3. In a velocipede, in combination with two rear supporting-wheels having a common axis, the rear frame in which such wheels are journaled, the pedal-crank-shaft bearings secured to the rear frame and located forward of the rear wheel-axle, a forward frame or reach to the steering-head, connected to the rear frame by a horizontal pivot which is located rearward of the vertical plane of the pedal-crank-shaft bearings, said forward frame or reach consisting of an arm extending forward from its pivot outside of the vertical plane of the nearest pedal, and a horizontal bracket-like extension proceeding from the rear end of said forwardly-reaching arm laterally toward the opposite side of the machine and located wholly rearward of the vertical plane of the pedal-crank-shaft bearings, whereby the frame is rendered entirely open above and forward of the pedals, substantially as set forth.

4. In a velocipede having two rear driving-wheels which have a common axis, the frame in which said wheels are journaled, consisting of a cross-bar, $A^3$, and a side bar extending forwardly therefrom at the extremity thereof, a front frame or reach to the steering-head, pivoted to said rear frame upon a horizontal pivot and extending forwardly therefrom, and a spring reacting between said side bar and said reach to depress the reach with respect to the side bar, substantially as set forth.

5. In a velocipede, in combination with the rear frame, comprising the cross-bar $A^3$ and a side bar, as $A'$, extending forwardly therefrom, the forward frame or reach to the steering-head, pivoted to the rear frame upon a horizontal pivot parallel with the axis of the driving-wheels and extending forwardly from said pivot, the said side bar, $A'$, having a portion extended laterally and overhanging the reach, and a spring reacting between said overhanging extension and tending to depress the reach with respect to the side bar, substantially as set forth.

6. In combination, substantially as set forth, the rear frame having the journal-bearings for the pair of driving-wheels and the front frame pivoted to said rear frame, its pivot being parallel with the axis of said wheels, a spring reacting between the two frames and tending to depress the forward frame relatively to the rear frame, and a check to limit the action of said spring and retain the frames against too great separation, substantially as set forth.

7. In a velocipede having two rear driving-wheels which have the same axis, the rear frame having the journal-bearings for said wheels, and side bars projecting forwardly from the lateral extremities of said frame, and the forward frame or reach pivoted to said rear frame between said side bars, and a spring reacting between one of the side bars and the reach to depress the latter, substantially as set forth.

8. In combination, substantially as set forth, the rear frame comprising the cross-bar $A^3$, having the projecting lugs $A^4$ $A^4$, and the pedal-crank-shaft-bearing arms D, connected to said lugs and extending forwardly therefrom, substantially as set forth.

9. In combination with the transverse frame-bar $A^3$, the clip or bracket $A^5$, secured upon the forward side of said frame-bar, and having a pivot-bearing for the reach or forward frame and an upwardly and downwardly extending socket for the seat-support, substantially as set forth.

10. In a velocipede, in combination with a shaft-bearing comprising two parts longitudinally separated by an interval, a handle-rod journaled in said bearings and having secured upon it and located in said interval a stop-collar, whereby said stop-collar stops the bar from movement in both directions, substantially as set forth.

11. In a velocipede, in combination with the rear frame comprising the cross-bar $A^3$ and the side bar $A^2$, said side bar having in its forward end the bearing for the brake-rod, comprising the parts $A^{20}$ $A^{20}$, longitudinally separated, the brake-rod journaled in said bearing and having secured upon it and located in said interval the stop-collar $H'$, having the crank-arm $H^{10}$, the brake-lever pivoted to the frame on a horizontal pivot, and the brake-connecting rod $H^2$, joined to said lever and to the crank-arm $H^{10}$, substantially as set forth.

12. In combination with the frame-bar $A^3$, the trailing arm pivoted thereto, the clamp $E'$, adapted to slide and be set fast in said arm, and the link $E^2$, connecting said clamp to the frame, whereby said arm may be caused to extend more or less directly rearward, and may be adjustably secured at any desired position between horizontal and vertical, substantially as set forth.

13. In combination with the frame, the telescoping trailing arm E $E^3$, having one part connected to the frame, the said part E being tubular and split at its rear end and provided with lugs clamped upon the part $E^3$, substantially as set forth.

In testimony whereof I have hereunto set my hand, in the presence of two witnesses, at Chicago, Illinois, this 8th day of May, 1888.

THOS. B. JEFFERY.

Witnesses:
  E. F. BURTON,
  JEAN ELLIOTT.